United States Patent
Mordkovich et al.

(10) Patent No.: US 8,735,317 B2
(45) Date of Patent: May 27, 2014

(54) CATALYST FOR SYNTHESIS OF HYDROCARBONS FROM CO AND $H_2$ AND PREPARATION METHOD THEREOF

(75) Inventors: Vladimir Zalmanovich Mordkovich, Moscow (RU); Lilia Vadimova Sineva, Moscow (RU); Igor Grigorievich Solomonik, Moscow (RU); Vadim Sergeevich Ermolaev, Moscow (RU); Eduard Borisovich Mitberg, Ekaterinburg (RU)

(73) Assignee: Infra XTL Technology Limited, Limassol (CY)

( * ) Notice: Subject to any disclaimer, the term of this patent is extended or adjusted under 35 U.S.C. 154(b) by 184 days.

(21) Appl. No.: 13/375,560

(22) PCT Filed: Jun. 15, 2010

(86) PCT No.: PCT/RU2010/000323
§ 371 (c)(1),
(2), (4) Date: Dec. 1, 2011

(87) PCT Pub. No.: WO2010/147513
PCT Pub. Date: Dec. 23, 2010

(65) Prior Publication Data
US 2012/0115710 A1    May 10, 2012

(30) Foreign Application Priority Data
Jun. 16, 2009  (RU) .................................. 2009122688

(51) Int. Cl.
| | | |
|---|---|---|
| *B01J 21/18* | (2006.01) | |
| *B01J 27/20* | (2006.01) | |
| *B01J 25/00* | (2006.01) | |
| *B01J 23/00* | (2006.01) | |
| *B01J 23/02* | (2006.01) | |
| *B01J 23/06* | (2006.01) | |

(52) U.S. Cl.
USPC ........... 502/174; 502/301; 502/340; 502/341; 502/349

(58) Field of Classification Search
USPC .......................... 502/174, 301; 815/715–717; 518/715–717
See application file for complete search history.

(56) References Cited

U.S. PATENT DOCUMENTS

| | | | |
|---|---|---|---|
| 4,895,994 A | 1/1990 | Cheng et al. | |
| 5,935,897 A * | 8/1999 | Trubenbach et al. | 502/172 |
| 6,156,694 A * | 12/2000 | Harper | 502/301 |
| 6,624,204 B1 * | 9/2003 | Daage et al. | 518/709 |
| 2001/0047041 A1 * | 11/2001 | Lapidus et al. | 518/715 |
| 2003/0052006 A1 | 3/2003 | Noca et al. | |
| 2004/0132832 A1 * | 7/2004 | Espinoza et al. | 518/716 |
| 2005/0103990 A1 | 5/2005 | Pham-Huu et al. | |
| 2006/0165986 A1 * | 7/2006 | Potapova et al. | 428/402 |

FOREIGN PATENT DOCUMENTS

| | | | | |
|---|---|---|---|---|
| RU | 2256501 | * | 7/2005 | B01J 23/75 |
| RU | 2236732 C1 | | 6/2008 | |
| RU | 2326732 | * | 6/2008 | B01J 21/02 |
| WO | WO 99/25652 A1 | | 5/1999 | |
| WO | WO 2005/065100 A2 | | 7/2005 | |
| WO | WO 2008/079051 A1 | | 7/2008 | |
| WO | 2011/016759 | * | 2/2011 | B01J 23/44 |

OTHER PUBLICATIONS

"Preparation and Properties of Raney Nickel—Cobalt Catalysts," J. P. Orchard et al. Journal of Catalysis 84 (1983), pp. 189-199.*
"Fischer-Tropsch synthesis in the presence of composite catalysts with different types of active cobalt," Lilia V. Sineva et al. Mendeleev Commun., 2013, 23, pp. 44-45.*
He, N. et al. 1999 "Effect of Structure and Pore Size of Mesoporous Molecular Sieve Materials on the Growth of Carbon Nanotubes" *Journal of Inclusion Phenomena and Macrocyclic Chemistry* 35: 211-224.
Jeong et al. 2002 "Packing Density Control of Aligned Carbon Nanotubes" *Chemistry of Materials* 14:10 4003-4005.
Zaman, M. et al. 2009 "Fischer-Tropsch synthesis over cobalt dispersed on carbon nanotubes-based supports and activated carbon" *Fuel Processing Technology* 90: 1214-1219.

* cited by examiner

*Primary Examiner* — Patricia L Hailey
(74) *Attorney, Agent, or Firm* — Knobbe, Martens, Olson & Bear, LLP

(57) ABSTRACT

The present invention relates to petrochemistry, gas chemistry, coal chemistry, particularly the invention relates to a catalyst for synthesis of hydrocarbons from CO and $H_2$ and a preparation method thereof. The catalyst is pelletized and comprises at least Raney cobalt as active component in an amount of 1-40% by weight based on the total weight of the catalyst, metallic aluminium in an amount of 25-94% by weight based on the total weight of the catalyst and a binder in an amount of 5-30% by weight based on the total weight of the catalyst. The present invention provides the catalyst stability to overheating and high productivity of hydrocarbons $C_5$-$C_{100}$ for synthesis of hydrocarbons from CO and $H_2$.

24 Claims, No Drawings

CATALYST FOR SYNTHESIS OF HYDROCARBONS FROM CO AND $H_2$ AND PREPARATION METHOD THEREOF

RELATED APPLICATIONS

This application is U.S. National Phase of International Application PCT/RU2010/000323, filed Jun. 15, 2010 designating the U.S., and published in English as WO 2010/147513 on Dec. 23, 2010, which claims priority to Russian Federation Application No. 2009122688 filed Jun. 16, 2009.

FIELD OF THE INVENTION

The present invention relates to petrochemistry, gas chemistry, coal chemistry. Particularly the present invention relates to a catalyst for synthesis of hydrocarbons $C_5$-$C_{100}$ from CO and $H_2$ and a preparation method thereof.

BACKGROUND OF THE INVENTION

The production of hydrocarbons from synthesis gas, i.e. carbon monoxide and hydrogen (the Fischer-Tropsch process) is well known. Suitable Fischer-Tropsch catalysts comprise a metal selected from Group VIII of the Mendeleev's Periodic Table of the Elements. Depending on the catalyst composition different products are obtained.

The Fischer-Tropsch process is highly exothermic and temperature-sensitive. High temperature leads to improving the catalyst activity however the selectivity for the main products drops because of by-product formation, such as methane and carbon dioxide. For the creation of the innovative, effective and selective catalysts there is a need in innovative solutions, which provide stability to overheating and hence isothermality of the reactor. Therefore the effective production of hydrocarbons from synthesis gas requires new type catalysts.

One of the methods for overcoming the process problem in a fixed bed reactor is increasing of the heat conductivity of the pelletized catalyst. In this case the heat-conducting materials are used for the Fischer-Tropsch catalysts. It is known that the heat-conducting materials are used as support of the catalysts.

For example, RU2256501 relates to a catalyst for synthesis of hydrocarbons from CO and $H_2$ based on cobalt. The catalyst comprises the powder of metallic aluminium as support that provides high heat conductivity. The catalyst is prepared as follows: the aluminium powder is impregnated with an aqueous solution of cobalt nitrate. Then the impregnated powder is dried on water bath and calcined at 450° C. for 1 hour. However the catalyst has low selectivity and productivity on the main products.

RU2326732 provides the catalyst pellets for synthesis of hydrocarbons from CO and $H_2$ comprising a metal of the VIII group of the Mendeleev's Periodic Table of the Elements and metallic aluminium. The document provides the following preparation method of the catalyst: the active metal (5-40% by weight based on the total weight of the catalyst) is applied by impregnation to the support which is prepared from a paste by extrusion; the paste comprises an oxide component (aluminium oxide and/or silicon oxide and/or titanium oxide and/or zirconium oxide), 1-25% wt metallic aluminium in the form of scales and 5-15% wt boehmite SB-1. The support (that contains the oxide component, the powder of metallic aluminium, diethyl ether, a binder, water, a plasticizer and a pore-forming component) is prepared by extrusion, drying, calcinating, and then the consecutive stages of the impregnation of the support with an aqueous solution of the salt of the active metal are carried out. The support can contain 0.1-5% by weight of a promoter (zirconium or a metal of the VIII group of the Mendeleev's Periodic Table of the Elements and/or oxides) introduced by impregnation with an aqueous solution of the salt of the promoter. However the active component is applied to the support by impregnation, it results in overconsumption of the expensive active metal because the support contains both oxide component and metallic aluminium.

U.S. Pat. No. 6,642,281 discloses using of dispersed active metals, particularly Raney cobalt, as active component in the catalytic hydrogenation of CO. The catalyst is prepared by alloying of cobalt with aluminium, titanium, silicon or zinc, cooling, comminuting of the alloy to a fine powder followed by chemical extraction or dissolution of aluminium, titanium, silicon or zinc. Here Raney cobalt (skeletal cobalt) is used as separate catalyst in catalytic hydrogenation. Such catalyst is stable but quite expensive due to the high content of the cost intensive components. It is impossible to prepare such catalyst in pellets or in block.

U.S. Pat. No. 4,826,799 relates to catalyst pellets for hydrogenation and a preparation method thereof. The catalyst contains 15-50 weight parts of Raney metal, 1-30 weight parts of high polymer (e.g., polyethylene), 1-42 weight parts of α-oxide of aluminium and homogeneous filler. 0-40 weight parts of mineral oil is used as a plasticizer. The mixture is formed by extrusion or alloying, the polymer and the plasticizer are removed by calcination at a temperature of 850-1200° C. Once the alloys are formed, they are treated to extract aluminium with sodium hydroxide.

Therefore the catalysts and the preparation methods have the following principal drawbacks: high cost due to high content of the expensive components; low heat conductivity of pellets; difficulty and need of high temperature processing that requires special equipment, increase the catalyst cost and makes difficult the preparation method.

Summarizing the aforesaid, a need exists for an improved effective and selective, low cost catalyst which is stable to overheating. As well as there is a need in a simple preparation method of the catalyst.

SUMMARY OF THE INVENTION

In accordance with the present invention, a catalyst for synthesis of hydrocarbons from CO and $H_2$ is provided. The catalyst comprises the dispersed particles of Raney cobalt powder or carbonyl cobalt as active component, metallic aluminium forming the spatial heat-conducting lattice and a binder moreover the dispersed particles are embedded into the spatial heat-conducting lattice of metallic aluminium and the catalyst is pelletized.

In one preferred embodiment of the invention the Raney cobalt or carbonyl cobalt content is in the range 1-40% by weight based on the total weight of the catalyst.

In one preferred embodiment of the invention the metallic aluminium content is in the range 25-94% by weight based on the total weight of the catalyst.

In one preferred embodiment of the invention the metallic aluminium is a dispersed powder.

In one preferred embodiment of the invention the binder is boehmite or silicon oxide (aerosil).

The binder content is in the range 5-30% by weight based on the total weight of the catalyst.

The catalyst can further comprise the additives of oxides or mixed oxides of elements selected from the following group: Mg, Zr, Ti, Ca, Ba, Al, Si and/or mixtures thereof.

In one preferred embodiment of the invention the additive content is in the range 0.5-30% by weight based on the total weight of the catalyst.

The catalyst can further comprise one or more active components.

In one preferred embodiment of the invention Co and/or Ru are used as active components.

In one preferred embodiment of the invention the active component content is in the range 5-30% by weight based on the total weight of the catalyst.

The catalyst can further comprise a the promoter selected from the group consisting of an element of Group II-IV and/or VI-VIII of the Mendeleev's Periodic Table of the Elements.

The present invention also relates to a method for preparing of a catalyst for synthesis of hydrocarbons from CO and $H_2$. The method comprises the steps of mixing of the dispersed powder of Raney cobalt or carbonyl cobalt, metallic aluminium, a binder and liquid phase to obtain the homogeneous paste; extrusion of the paste with formation of the catalyst pellets with the spatial lattice of metallic aluminium and the Raney cobalt or carbonyl cobalt particles embedded into the lattice; drying and calcinating of the pellets.

In one preferred embodiment of the invention Raney cobalt and carbonyl cobalt is used in an amount of about 1-40% by weight based on the total weight of the catalyst.

In one preferred embodiment of the invention metallic aluminium is used in an amount of about 25-94% by weight based on the total weight of the catalyst.

In one preferred embodiment of the invention the boehmite or silicon oxide (aerosil) is used as the binder and in an amount of about 5-30% by weight based on the total weight of the catalyst.

In one preferred embodiment of the invention the mixture of distilled water, nitric acid or aqueous ammonia, triethylene glycol and/or polyvinyl alcohol is used as the liquid phase.

In one preferred embodiment of the invention the drying of the pellets is carried out in air or inert gas flow at temperature of 25-120° C. during 12-36 hours, preferably 18-24 hours.

In one preferred embodiment of the invention the calcinating of the pellets is carried out in air or inert gas flow in stages with increase in temperature from 120 to 450° C. during 8-36 hours, preferable 12-20 hours.

In one preferred embodiment of the invention the additional active components are introduced into the calcined pellets by impregnation in stages with a solution of metal compound, particularly compounds of Co and/or Ru, moreover the impregnation is repeated until the content 5-30% of the active components by weight based on the total weight of the catalyst has been achieved.

In one preferred embodiment of the invention after each stage of the impregnation the drying of the pellets is performed on air at temperature of 80-90° C. during 0.5-1.5 hours and then the pellets are calcinated in air flow at 200-450° C. during 0.5-15 hours.

DETAIL DESCRIPTION OF PREFERRED EMBODIMENTS

Numerous studies of the inventors demonstrate that using of Raney cobalt as active component in the Fischer-Tropsch catalysts is the best practice. Raney cobalt provides high selectivity for the main products, stability during synthesis of hydrocarbons from CO and $H_2$ however it is quite expensive and exhibits its best qualities only if the intensive heat removal is provided.

The actual catalysts containing Raney cobalt are very expensive due to high content of the active component and they do not have high heat conductivity even in form of pellets. These factors hinder using of such catalysts in the synthesis of hydrocarbons from CO and $H_2$.

As well as it will be interesting to use metallic aluminium in the composition of the catalyst because aluminium has high heat conductivity and improves heat removal from the reaction zone; it leads to improvement of the stability of the catalyst performance.

However the metallic aluminium is used as support in the known catalysts and hence the expensive active metal is used uneconomically; moreover the active metal in such catalysts is not used in the more effective form of Raney cobalt.

It should to be noted that using of the catalysts in pellets is preferable.

The advantages of catalyst pellets are well known; particularly they can form the fixed bed with low flow resistance in a reactor. Such fixed pellets give option to supply the components of the raw material to active centers of the catalyst and take away the products. The reactors with such pellets have the advantages of simplicity, reliability and low price; they do not require using of the special mixing devices and other difficult devices which are necessary for the reactors with the catalysts of the dispersed particles or powders. Summarizing the aforesaid the advantages of the active, effective and efficient catalyst pellets are clear versus other catalysts disclosed in the prior art.

For the first time inventors were successful in preparing the catalyst for the synthesis of hydrocarbons, particularly hydrocarbons $C_5$-$C_{100}$ from CO and $H_2$ with advantages mentioned above and without indicated shortages.

It became achievable due to the combination in the catalyst of Raney cobalt as active component and metallic aluminium.

The studies of the inventors demonstrate that only the extrusion of the homogeneous paste containing the particles of the dispersed Raney cobalt, metallic aluminium, a binder allows preparing the pellets with the spatial heat-conducting lattice of metallic aluminium with Raney cobalt dispersed particles embedded into the lattice. Such structure of the catalyst provides the high heat conductivity on one hand and allows using the active metal in low amount. Therefore Raney cobalt plays the double role: the active component of the catalyst and the component of the spatial heat-conducting lattice.

It is important that the active metal is not introduced into the catalyst by impregnation but through mixing of the dispersed components with obtaining of the homogeneous paste, followed by extrusion, drying and calcinating.

Moreover it was found that it is the extrusion which allows preparing such catalyst structure.

The differential characteristic of the preparing the catalyst with the disclosed lattice is existence of the metallic luster on the surface of the pellets whereas the pellets of usual catalyst without such lattice are opaque.

Raney cobalt or carbonyl cobalt is used as active component in the present invention. Raney cobalt is produced in industry by leaching of Raney alloy. Carbonyl cobalt is produced in industry by decomposition of gaseous carbonyl cobalt.

The content of Raney cobalt or carbonyl cobalt is 1-40% by weight based on the total weight of the catalyst. When the content is less than 1%, the satisfactory productivity of the catalyst will not be achieved. If the content is more than 40% then the spatial heat-conducting lattice will fail the heat removal from such amount of the active component and in the case the increase in productivity will not take place.

Metallic aluminium can be in the form of aluminium powder, dispersed powder or another dispersed form, e.g., wire of thickness less than 100 μm. The metallic aluminium content is 25-94% by weight based on the total weight of the catalyst. If the content of the dispersed aluminium is less than 25%, then the formation of the spatial heat-conducting lattice will not be provided; if more than 94%, the catalyst activity for the hydrocarbon synthesis from CO and $H_2$ will decrease.

Boehmite or silicon oxide (aerosol) is used as binder in the present invention; moreover the binder content is 5-30% by weight based on the total weight of the catalyst. If the binder content is less than 5%, the substantial drop of the pellet strength will take place, if more than 30%, the catalyst activity for the hydrocarbon synthesis from CO and $H_2$ will decrease.

The powdery additives of oxides or mixed oxides of the elements selected of the group: Mg, Zr, Ti, Ca, Ba, Al, Si or mixture thereof can be additionally introduced into the mixture for the paste preparation. Such additives increase adaptability of the catalyst preparation. The additive content is 0.5-30% by weight based on the total weight of the catalyst. If the additive content is less than 0.5%, the catalyst properties will not be affected; if more than 30%, the catalyst activity for the hydrocarbon synthesis from CO and $H_2$ will decrease.

The important advantage of the catalyst is the possibility of introducing one or more additional active components. Preferably Co and/or Ru are used as additional active components.

The content of the additional active components is 5-30% by weight based on the total weight of the catalyst. If the content is less than 5% the properties of the catalyst containing highly active Raney cobalt will not be affected; if more than 30%, it will not lead to further increasing in productivity but can have the negative reaction to selectivity of the main products.

The catalyst can further comprise promoters. The elements of II-IV and/or VI-VIII groups of the Mendeleev's Periodic Table of the Elements are used as the promoters.

In accordance with the present invention, a method for preparing of a catalyst for synthesis of hydrocarbons from CO and $H_2$ is provided The method comprises the steps of mixing of the dispersed powder of Raney cobalt or carbonyl cobalt, metallic aluminium, a binder and liquid phase to obtain the homogeneous paste; extrusion of the paste with formation of the catalyst pellets with the spatial lattice of metallic aluminium and the Raney cobalt or carbonyl cobalt particles embedded into the lattice; drying and calcinating of the pellets.

In one preferred embodiment of the invention Raney cobalt and carbonyl cobalt is used in an amount of about 1-40% by weight based on the total weight of the catalyst.

In one preferred embodiment of the invention metallic aluminium is used in an amount of about 25-94% by weight based on the total weight of the catalyst.

In one preferred embodiment of the invention the boehmite or silicon oxide (aerosil) is used as the binder and in an amount of about 5-30% by weight based on the total weight of the catalyst.

In one preferred embodiment of the invention the mixture of distilled water, nitric acid or aqueous ammonia, triethylene glycol and/or polyvinyl alcohol is used as the liquid phase.

The liquid phase is necessary for obtaining of the homogeneous paste with the required consistency; it allows preparing proper pellets at the stage of the extrusion.

The drying of the pellets is carried out in air or inert gas flow at temperature of 25-120° C. during 12-36 hours, preferably 18-24 hours.

The calcinating of the pellets is carried out in air or inert gas flow in stages with increase in temperature from 120 to 450° C. during 8-36 hours, preferable 12-20 hours.

The additional active components are introduced into the calcined pellets by impregnation in stages with a solution of metal compound, particularly compounds of Co and/or Ru, moreover the impregnation is repeated until the content 5-30% of the active components by weight based on the total weight of the catalyst has been achieved.

Preferably after each stage of the impregnation the drying of the pellets is performed on air at temperature of 80-90° C. during 0.5-1.5 hours and then the pellets are calcinated in air flow at 200-450° C. during 0.5-15 hours.

Additionally the promoters can be introduced into the calcined pellets by impregnation with solution of II-IV and/or VI-VIII group of the Mendeleev's Periodic Table of the Elements; moreover the impregnation is repeated until the content 0.1-5% of the promoters by weight based on the total weight of the catalyst has been achieved. After impregnation the drying of the pellets is carried out on air at temperature of 80-90° C. during 0.5-1.5 hours and then the pellets are calcinated in air flow at 200-450° C. during 0.5-15 hours.

The catalyst is prepared as follows:

The mixture of 1-40 wt % of the Raney cobalt powder, 25-94 wt % of the metallic aluminium powder and 5-30 wt % of the binder powder is added to the liquid phase consisting of distilled water, nitric acid or aqueous ammonia, triethylene glycol and/or polyvinyl alcohol. The powdery additives of oxides or mixed oxides of the elements selected of the group: Mg, Zr, Ti, Ca, Ba, Al, Si or mixture thereof can be additionally introduced into the paste in amount of 0.5-30 wt %. The paste is extruded with preparing of the pellets. The pellets are dried in air or inert gas at temperature of 25-120° C. during 12-36 hours, preferably 18-24 hours. Calcinating of the pellets is carried out in air or inert gas flow with increase in temperature from 120 to 450° C. during 8-36 hours, preferable 12-20 hours.

The additional active components are introduced into the calcined pellets by impregnation in stages with a solution of metal compound, particularly compounds of Co and/or Ru, moreover the impregnation is repeated until the content 5-30% of the active components by weight based on the total weight of the catalyst has been achieved. Preferably after each stage of the impregnation the drying of the pellets is performed on air at temperature of 80-90° C. during 0.5-1.5 hours and then the pellets are calcinated in air flow at 200-450° C. during 0.5-15 hours.

Additionally the promoters can be introduced into the calcinated pellets by impregnation with a solution of an element of Group II-IV and/or VI-VIII of the Mendeleev's Periodic Table of the Elements; moreover the impregnation is repeated until the content 0.1-5% of the promoters by weight based on the total weight of the catalyst has been achieved. After impregnation the drying of the pellets is carried out on air at temperature of 80-90° C. during 0.5-1.5 hours and then the pellets are calcinated in air flow at 200-450° C. during 0.5-15 hours.

Before carrying out the synthesis, a sample of the catalyst is activated by reduction in the stream of hydrogen or hydrogen containing gas (gas hour space rate 1000-10000 l/h, preferably 3000-5000 l/h) at a temperature in the range from 300 to 450° C. and atmospheric pressure during a time period from 0.5 to 10 hours (preferably from 1 to 5 hours).

Synthesis of $C_5$-$C_{100}$ hydrocarbons from CO:$H_2$ is carried out in a tubular reactor with a fixed bed of the claimed catalyst under a pressure in the range from 1 to 5 MPa, preferably, from 2 to 3.5 MPa and a temperature in the range from 160 to 350° C., preferably, from 180 to 250° C. The molar ratio of $CO:H_2$ in synthesis gas is in the range from 1:1 to 1:3 (preferably from 1:2 to 2.5). The synthesis gas can contain up to 50% nitrogen.

To further illustrate various illustrative embodiments of the present invention the following examples are provided:

EXAMPLE 1

A sample of catalyst comprising 10% Raney Co+70% Al+20% boehmite is prepared as follows.

0.5 g of boehmite, 1.75 g of aluminium powder of grade PAP-2 and 0.25 g of Raney cobalt powder were added to liquid phase containing 0.15 ml $HNO_3$ (64%), 2.5 ml of distilled water and 0.15 ml of triethylene glycol (TEG) and stirring was continued until a homogeneous mixture was obtained. Then the mixture was extruded through a die of diameter 2.5 mm. The pellets were dried in a drying oven. The regime of drying is 25-120° C. during 20 h. The dried pellets are then calcined in a muffle on air with increase in temperature from 120 to 190° C. with rate of 35° C./hour, from 190 to 250° C. with rate of 15° C./hour, from 250 to 450° C. with rate of 50° C./hour, the pellets were at 450° C. for 5 hours. Then the pellets were cooled to the room temperature and cut to 2.5 mm segments.

EXAMPLE 2

A sample of catalyst comprising 20% Raney Co+70% Al+10% boehmite is prepared as follows.

0.25 g of boehmite, 1.75 g of aluminium powder of grade PAP-2 and 0.5 g of Raney cobalt powder were added to liquid phase containing 0.1 ml $HNO_3$ (64%), 2 ml of distilled water and 0.15 ml of triethylene glycol (TEG) and stirring was continued until a homogeneous mixture was obtained. Then the mixture was extruded through a die of diameter 2.5 mm. The obtained pellets are dried, calcined, cooled and cut as described in EXAMPLE 1.

EXAMPLE 3

A sample of catalyst comprising 20% Raney Co+50% Al+30% boehmite is prepared as follows.

0.75 g of boehmite, 1.25 g of aluminium powder of grade PAP-1 and 0.5 g of Raney cobalt powder were added to liquid phase containing 0.3 ml $HNO_3$ (64%), 2 ml of distilled water and 0.25 ml of triethylene glycol (TEG) and stirring was continued until a homogeneous mixture was obtained. Then the mixture was extruded through a die of diameter 2.5 mm. The obtained pellets are dried, calcined, cooled and cut as described in EXAMPLE 1.

EXAMPLE 4

A sample of catalyst comprising 40% Raney Co+30% Al+30% boehmite is prepared as follows.

0.75 g of boehmite, 0.75 g of aluminium powder of grade ASD-1 and 1 g of Raney cobalt powder were added to liquid phase containing 0.3 ml $HNO_3$ (64%), 2 ml of distilled water and 0.25 ml of triethylene glycol (TEG) and stirring was continued until a homogeneous mixture was obtained. Then the mixture was extruded through a die of diameter 2.5 mm. The obtained pellets are dried, calcined, cooled and cut as described in EXAMPLE 1.

EXAMPLE 5

A sample of catalyst comprising 1% Raney Co+94% Al+5% boehmite is prepared as follows.

0.125 g of boehmite, 2.365 g of aluminium powder of grade PAP-2 and 0.01 g of Raney cobalt powder were added to liquid phase containing 0.1 ml $HNO_3$ (64%), 3 ml of distilled water and 0.15 ml of triethylene glycol (TEG) and stirring was continued until a homogeneous mixture was obtained. Then the mixture was extruded through a die of diameter 2.5 mm. The obtained pellets are dried, calcined, cooled and cut as described in EXAMPLE 1.

EXAMPLE 6

A sample of catalyst comprising 10% Raney Co+77% Al+3% $ZrO_2$+10% boehmite is prepared as follows.

0.25 g of boehmite, 1.967 g of aluminium powder of grade PAG-1, 0.033 g of $ZrO_2$ powder and 0.25 g of Raney cobalt powder were added to liquid phase containing 0.15 ml $HNO_3$ (64%), 3 ml of distilled water and 0.15 ml of triethylene glycol (TEG) and stirring was continued until a homogeneous mixture was obtained. Then the mixture was extruded through a die of diameter 2.5 mm. The obtained pellets are dried, calcined, cooled and cut as described in EXAMPLE 1.

EXAMPLE 7

A sample of catalyst comprising 20% Co/(1% Raney Co+74% Al+5% boehmite) is prepared as follows.

0.125 g of boehmite, 2.365 g of aluminium powder of grade PAP-2 and 0.01 g of Raney cobalt powder were added to liquid phase containing 0.1 ml $HNO_3$ (64%), 3 ml of distilled water and 0.15 ml of triethylene glycol (TEG) and stirring was continued until a homogeneous mixture was obtained. Then the mixture was extruded through a die of diameter 2.5 mm. The obtained pellets are dried, calcined, cooled and cut as described in EXAMPLE 1.

Then 20% Co from the aqueous solution of $Co(NO_3)_2 \cdot 6H_2O$ is applied to the pellets (1% Raney Co+74% Al+5% boehmite) in two stages.

Stage 1 1.54 g $Co(NO_3)_2 \cdot 6H_2O$ is dissolved in 1.5 ml of distilled water, the solution is added to 2.5 g of the pellets (1% Raney Co+74% Al+5% boehmite), hold 0.5 h. Then the pellets are dried in water bath during 45 min, calcinated in the air flow at temperature of about 400° C. during 1 h.

Stage 2 1.54 g $Co(NO_3)_2 \cdot 6H_2O$ is dissolved in 1.5 ml of distilled water, the solution is added to the material obtained on the Stage 1 and cooled to the room temperature. Then the pellets are dried in water bath during 45 min, calcinated in the air flow at temperature of about 400° C. during 1 h.

EXAMPLE 8

A sample of catalyst comprising 20% Co/(1% Co+74% Al+5% boehmite) is prepared as follows.

0.125 g of boehmite, 2.365 g of aluminium powder of grade PAP-2 and 0.01 g of carbonyl cobalt powder were added to liquid phase containing 0.1 ml $HNO_3$ (64%), 3 ml of distilled water and 0.15 ml of triethylene glycol (TEG) and stirring was continued until a homogeneous mixture was obtained. Then the mixture was extruded through a die of diameter 2.5 mm. The obtained pellets are dried, calcined, cooled and cut as described in EXAMPLE 1.

Then 20% Co from the aqueous solution of $Co(NO_3)_2 \cdot 6H_2O$ is applied to the pellets (1% Co+74% Al+5% boehmite) in two stages as described in EXAMPLE 7.

EXAMPLE 9

A sample of catalyst comprising 10% Co/(9% Raney Co+58.5% Al+4.5% MgO+9% boehmite) is prepared as follows.

0.75 g of boehmite, 1.145 g of aluminium powder of grade PAP-2, 0.05 g of MgO powder and 0.25 g of Raney cobalt powder were added to liquid phase containing 0.3 ml $HNO_3$ (64%), 3 ml of distilled water and 0.2 ml of triethylene glycol (TEG) and stirring was continued until a homogeneous mixture was obtained. Then the mixture was extruded through a die of diameter 2.5 mm. The obtained pellets are dried, calcined, cooled and cut as described in EXAMPLE 1.

Then 10% Co from the aqueous solution of Co$(NO_3)_2.6H_2O$ is applied to the pellets (9% Raney Co+58.5% Al+4.5% MgO+9% boehmite) in one stage. For this purpose 1.37 g Co$(NO_3)_2.6H_2O$ is dissolved in 1.5 ml of distilled water, the solution is added to 2.5 g of the pellets (9% Raney Co+58.5% Al+4.5% MgO+9% boehmite), hold 0.5 h. Then the pellets are dried in water bath during 45 min, calcined in the air flow at temperature of about 250° C. during 1 h.

EXAMPLE 10

A sample of catalyst comprising 30% Co/(3.5% Raney Co+38.5% Al+7% $SiO_2$+21% aerosil) is prepared as follows.

0.75 g of aerosil, 1.375 g of aluminium powder of grade PAP-2, 0.25 g of $SiO_2$ powder and 0.125 g of Raney cobalt powder were added to liquid phase containing 0.5 ml of aqueous ammonia (25%), 3 ml of distilled water and 0.25 ml of triethylene glycol (TEG) and stirring was continued until a homogeneous mixture was obtained. Then the mixture was extruded through a die of diameter 2.5 mm. The obtained pellets are dried, calcined, cooled and cut as described in EXAMPLE 1.

Then 30% Co from the aqueous solution of Co$(NO_3)_2.6H_2O$ is applied to the pellets (3.5% Raney Co+38.5% Al+7% $SiO_2$+21% aerosil) in three stages.

Stage 1 1.76 g Co$(NO_3)_2.6H_2O$ is dissolved in 1.5 ml of distilled water, the solution is added to 2.5 g of the pellets (3.5% Raney Co+38.5% Al+7% $SiO_2$+21% aerosil), hold 0.5 h. Then the pellets are dried in water bath during 45 min, calcinated in the air flow at temperature of about 450° C. during 1 h.

Stage 2 1.76 g Co$(NO_3)_2.6H_2O$ is dissolved in 1.5 ml of distilled water, the solution is added to the material obtained on the Stage 1 and cooled to the room temperature. Then the pellets are dried in water bath during 45 min, calcinated in the air flow at temperature of about 450° C. during 1 h.

Stage 3 1.76 g Co$(NO_3)_2.6H_2O$ is dissolved in 1.5 ml of distilled water, the solution is added to the material obtained on the Stage 2 and cooled to the room temperature. Then the pellets are dried in water bath during 45 min, calcinated in the air flow at temperature of about 450° C. during 1 h.

EXAMPLE 11

A sample of catalyst comprising 10% Co/(13.5% Raney Co+22.5% Al+27% $Al_2O_3$+27% boehmite) is prepared as follows.

0.75 g of boehmite, 0.625 g of aluminium powder of grade PAP-2, 0.75 g of γ-$Al_2O_3$ powder and 0.375 g of Raney cobalt powder were added to liquid phase containing 0.25 ml $HNO_3$ (64%), 3 ml of distilled water and 0.15 ml of triethylene glycol (TEG) and stirring was continued until a homogeneous mixture was obtained. Then the mixture was extruded through a die of diameter 2.5 mm. The obtained pellets are dried, calcined, cooled and cut as described in EXAMPLE 1.

Then 10% Co from the aqueous solution of Co$(NO_3)_2.6H_2O$ is applied to the pellets (13.5% Raney Co+22.5% Al+27% $Al_2O_3$+27% boehmite) in one stage as described in EXAMPLE 9.

EXAMPLE 12

A sample of catalyst comprising 20% Co/(1% Raney Co+39% Al+24% HY+16% boehmite) is prepared as follows.

0.25 g of boehmite, 1.475 g of aluminium powder of grade PAP-2, 0.75 g of mixed oxide Al and Si powder in form of zeolite HY and 0.025 g of Raney cobalt powder were added to liquid phase containing 0.1 ml $HNO_3$ (64%), 2.5 ml of distilled water and 0.1 ml of triethylene glycol (TEG) and stirring was continued until a homogeneous mixture was obtained. Then the mixture was extruded through a die of diameter 2.5 mm. The obtained pellets are dried, calcined, cooled and cut as described in EXAMPLE 1.

Then 20% Co from the aqueous solution of Co$(NO_3)_2.6H_2O$ is applied to the pellets (1% Raney Co+39% Al+24% HY+16% boehmite) in two stages as described in EXAMPLE 7.

EXAMPLE 13

A sample of catalyst comprising 5% Ru/(9.5% Raney Co+47.5% Al+28.5% HMordenite+9.5% boehmite) is prepared as follows.

0.25 g of boehmite, 0.5 g of aluminium powder of grade PAP-2, 0.75 g of mixed oxide Al and Si powder in form of zeolite HMordenite and 0.125 g of Raney cobalt powder were added to liquid phase containing 0.1 ml $HNO_3$ (64%), 2.5 ml of distilled water and 0.1 ml of triethylene glycol (TEG) and stirring was continued until a homogeneous mixture was obtained. Then the mixture was extruded through a die of diameter 2.5 mm. The obtained pellets are dried, calcined, cooled and cut as described in EXAMPLE 1.

Then 5% Ru from the aqueous solution of $RuCl_3$ is applied to the pellets (9.5% Raney Co+47.5% Al+28.5% HMordenite+9.5% boehmite) in one stage. 0.257 g $RuCl_3$ is dissolved in 1.5 ml of distilled water, the solution is added to 2.5 g of the pellets (9.5% Raney Co+47.5% Al+28.5% HMordenite+9.5% boehmite), hold 0.5 h. Then the pellets are dried in water bath during 45 min, calcinated in the air flow at temperature of about 400° C. during 1 h.

EXAMPLE 14

A sample of catalyst comprising 20% Co–5% Zr/(1% Raney Co+39% Al+24% HY+16% boehmite) is prepared as follows.

The pellets (1% Raney Co+39% Al+24% HY+16% boehmite) are prepared as described in EXAMPLE 12.

Then 5% Zr and 20% Co from the aqueous solution of ZrO$(NO_3)_2.2H_2O$ and Co$(NO_3)_2.6H_2O$ accordingly is applied to the pellets (1% Raney Co+39% Al+24% HY+16% boehmite) in three stages.

Stage 1 0.39 g ZrO$(NO_3)_2.2H_2O$ is dissolved in 1.5 ml of distilled water, the solution is added to 2.5 g of the pellets (1% Raney Co+39% Al+24% HY+16% boehmite), hold 0.5 h. Then the pellets are dried in water bath during 45 min, calcinated in the air flow at temperature of about 450° C. during 1 h.

Stage 2 1.54 g Co$(NO_3)_2.6H_2O$ is dissolved in 1.5 ml of distilled water, the solution is added to the pellets obtained on the Stage 1 and cooled to the room temperature, hold 0.5 h. Then the pellets are dried in water bath during 45 min, calcinated in the air flow at temperature of about 250° C. during 1 h.

Stage 3 1.54 g Co$(NO_3)_2.6H_2O$ is dissolved in 1.5 ml of distilled water, the solution is added to the material obtained on the Stage 2 and cooled to the room temperature, hold 0.5 h. Then the pellets are dried in water bath during 45 min, calcinated in the air flow at temperature of about 250° C. during 1 h.

EXAMPLE 15

A sample of catalyst comprising 20% Co–2% La/(1% Raney Co+39% Al+24% HY+16% boehmite) is prepared as follows.

The pellets (1% Raney Co+39% Al+24% HY+16% boehmite) are prepared as described in EXAMPLE 12.

Then 2% La and 20% Co from the aqueous solution of $La(NO_3)_3.6H_2O$ and $Co(NO_3)_2.6H_2O$ accordingly is applied to the pellets (1% Raney Co+39% Al+24% HY+16% boehmite) in three stages.

Stage 1 0.159 g $La(NO_3)_3.6H_2O$ is dissolved in 1.5 ml of distilled water, the solution is added to 2.5 g of the pellets (1% Raney Co+39% Al+24% HY+16% boehmite), hold 0.5 h. Then the pellets are dried in water bath during 45 min, calcinated in the air flow at temperature of about 450° C. during 1 h.

Stage 2 1.54 g $Co(NO_3)_2.6H_2O$ is dissolved in 1.5 ml of distilled water, the solution is added to the pellets obtained on the Stage 1 and cooled to the room temperature, hold 0.5 h. Then the pellets are dried in water bath during 45 min, calcinated in the air flow at temperature of about 250° C. during 1 h.

Stage 3 1.54 g $Co(NO_3)_2.6H_2O$ is dissolved in 1.5 ml of distilled water, the solution is added to the material obtained on the Stage 2 and cooled to the room temperature, hold 0.5 h. Then the pellets are dried in water bath during 45 min, calcinated in the air flow at temperature of about 250° C. during 1 h.

EXAMPLE 16

A sample of catalyst comprising 20% Co–2% Mg/(1% Raney Co+39% Al+24% HY+16% boehmite) is prepared as follows.

The pellets (1% Raney Co+39% Al+24% HY+16% boehmite) are prepared as described in EXAMPLE 12.

Then 2% Mg and 20% Co from the aqueous solution of $Mg(NO_3)_2.6H_2O$ and $Co(NO_3)_2.6H_2O$ accordingly is applied to the pellets (1% Raney Co+39% Al+24% HY+16% boehmite) in three stages.

Stage 1 0.544 g $Mg(NO_3)_2.6H_2O$ is dissolved in 1.5 ml of distilled water, the solution is added to 2.5 g of the pellets (1% Raney Co+39% Al+24% HY+16% boehmite), hold 0.5 h. Then the pellets are dried in water bath during 45 min, calcinated in the air flow at temperature of about 450° C. during 1 h.

Stage 2 1.54 g $Co(NO_3)_2.6H_2O$ is dissolved in 1.5 ml of distilled water, the solution is added to the pellets obtained on the Stage 1 and cooled to the room temperature, hold 0.5 h. Then the pellets are dried in water bath during 45 min, calcinated in the air flow at temperature of about 250° C. during 1 h.

Stage 3 1.54 g $Co(NO_3)_2.6H_2O$ is dissolved in 1.5 ml of distilled water, the solution is added to the material obtained on the Stage 2 and cooled to the room temperature, hold 0.5 h. Then the pellets are dried in water bath during 45 min, calcinated in the air flow at temperature of about 250° C. during 1 h.

EXAMPLE 17

A sample of catalyst comprising 20% Co–2% Cr/(1% Raney Co+39% Al+24% HY+16% boehmite) is prepared as follows.

The pellets (1% Raney Co+39% Al+24% HY+16% boehmite) are prepared as described in EXAMPLE 12.

Then 2% Cr and 20% Co from the aqueous solution of $Cr(NO_3)_3.9H_2O$ and $Co(NO_3)_2.6H_2O$ accordingly is applied to the pellets (1% Raney Co+39% Al+24% HY+16% boehmite) in three stages.

Stage 1 0.392 g $Cr(NO_3)_3.9H_2O$ is dissolved in 1.5 ml of distilled water, the solution is added to 2.5 g of the pellets (1% Raney Co+39% Al+24% HY+16% boehmite), hold 0.5 h. Then the pellets are dried in water bath during 45 min, calcinated in the air flow at temperature of about 450° C. during 1 h.

Stage 2 1.54 g $Co(NO_3)_2.6H_2O$ is dissolved in 1.5 ml of distilled water, the solution is added to the pellets obtained on the Stage 1 and cooled to the room temperature, hold 0.5 h. Then the pellets are dried in water bath during 45 min, calcinated in the air flow at temperature of about 250° C. during 1 h.

Stage 3 1.54 g $Co(NO_3)_2.6H_2O$ is dissolved in 1.5 ml of distilled water, the solution is added to the material obtained on the Stage 2 and cooled to the room temperature, hold 0.5 h. Then the pellets are dried in water bath during 45 min, calcinated in the air flow at temperature of about 250° C. during 1 h.

EXAMPLE 18

A sample of catalyst comprising 20% Co–2% Fe/(1% Raney Co+39% Al+24% HY+16% boehmite) is prepared as follows.

The pellets (1% Raney Co+39% Al+24% HY+16% boehmite) are prepared as described in EXAMPLE 12.

Then 2% Cr and 20% Co from the aqueous solution of $Fe(NO_3)_3.9H_2O$ and $Co(NO_3)_2.6H_2O$ accordingly is applied to the pellets (1% Raney Co+39% Al+24% HY+16% boehmite) in three stages.

Stage 1 0.368 g $Fe(NO_3)_3.9H_2O$ is dissolved in 1.5 ml of distilled water, the solution is added to 2.5 g of the pellets (1% Raney Co+39% Al+24% HY+16% boehmite), hold 0.5 h. Then the pellets are dried in water bath during 45 min, calcinated in the air flow at temperature of about 450° C. during 1 h.

Stage 2 1.54 g $Co(NO_3)_2.6H_2O$ is dissolved in 1.5 ml of distilled water, the solution is added to the pellets obtained on the Stage 1 and cooled to the room temperature, hold 0.5 h. Then the pellets are dried in water bath during 45 min, calcinated in the air flow at temperature of about 250° C. during 1 h.

Stage 3 1.54 g $Co(NO_3)_2.6H_2O$ is dissolved in 1.5 ml of distilled water, the solution is added to the material obtained on the Stage 2 and cooled to the room temperature, hold 0.5 h. Then the pellets are dried in water bath during 45 min, calcinated in the air flow at temperature of about 250° C. during 1 h.

EXAMPLE 19

A sample of catalyst comprising 20% Co–0.1% Re/(1% Raney Co+39% Al+24% HY+16% boehmite) is prepared as follows.

The pellets (1% Raney Co+39% Al+24% HY+16% boehmite) are prepared as described in EXAMPLE 12.

Then 0.1% Re and 20% Co from the aqueous solution of $NH_4ReO_4$ and $Co(NO_3)_2.6H_2O$ accordingly is applied to the pellets (1% Raney Co+39% Al+24% HY+16% boehmite) in three stages.

Stage 1 0.0036 g NH$_4$ReO$_4$ is dissolved in 1.5 ml of distilled water, the solution is added to 2.5 g of the pellets (1% Raney Co+39% Al+24% HY+16% boehmite), hold 0.5 h. Then the pellets are dried in water bath during 45 min, calcinated in the air flow at temperature of about 450° C. during 1 h.

Stage 2 1.54 g Co(NO$_3$)$_2$.6H$_2$O is dissolved in 1.5 ml of distilled water, the solution is added to the pellets obtained on the Stage 1 and cooled to the room temperature, hold 0.5 h. Then the pellets are dried in water bath during 45 min, calcinated in the air flow at temperature of about 250° C. during 1 h.

Stage 3 1.54 g Co(NO$_3$)$_2$.6H$_2$O is dissolved in 1.5 ml of distilled water, the solution is added to the material obtained on the Stage 2 and cooled to the room temperature, hold 0.5 h. Then the pellets are dried in water bath during 45 min, calcinated in the air flow at temperature of about 250° C. during 1 h.

Before carrying out the synthesis, the catalysts are activated in the stream of hydrogen (gas hour space rate 3000 l/h) at temperature of 400° C. during 1 hour. Synthesis of hydrocarbons from CO:H$_2$=1/2 (mol) is carried out in a tubular reactor with a fixed bed of the claimed catalyst under a pressure of 2 MPa and temperature of 160-240° C. The feed rate of gas is 2000 l/h.

The results of the synthesis of hydrocarbons from CO and H$_2$ with samples of the catalysts of the composition according to Examples 1-19 are shown in the TABLE 1 below.

TABLE 1

| Example | Catalyst composition | CO conversion, % | Productivity, kg/(m$^3$·h) | Expectation of chain growth |
|---|---|---|---|---|
| 1 | 10% Co Raney + 70% Al + 30% boehmite | 83 | 179 | 0.80 |
| 2 | 20% Co Raney + 70% Al + 20% boehmite | 90 | 190 | 0.83 |
| 3 | 20% Co Raney + 50% Al + 30% boehmite | 88 | 185 | 0.84 |
| 4 | 40% Co Raney + 30% Al + 30% boehmite | 90 | 180 | 0.85 |
| 5 | 1% Co Raney + 94% Al + 5% boehmite | 65 | 155 | 0.85 |
| 6 | 10% Co Raney + 77% Al + 3% ZrO$_2$ + 10% boehmite | 85 | 181 | 0.84 |
| 7 | 20% Co/(1% Co Raney + 74% Al + 5% boehmite) | 85 | 190 | 0.83 |
| 8 | 20% Co/(1% Co + 74% Al + 5% boehmite) | 83 | 187 | 0.82 |
| 9 | 10% Co/(9% Co Raney + 58.5% Al + 4.5% MgO + 9% boehmite) | 88 | 192 | 0.81 |
| 10 | 30% Co/(3.5% Co Raney + 38.5% Al + 7% SiO2 + 21% aerosil) | 89 | 188 | 0.79 |
| 11 | 10% Co/(13.5% Co Raney + 22.5% Al + 27% Al$_2$O$_3$ + 27% boehmite) | 92 | 190 | 0.84 |
| 12 | 20% Co/(1% Co Raney + 39% Al + 24% HY + 16% boehmite) | 95 | 195 | 0.72 |
| 13 | 5% Ru/(9.5% Co Raney + 47.5% Al + 28.5% HMor + 9.5% boehmite) | 82 | 187 | 0.78 |
| 14 | 20% Co – 5% Zr/(1% Co Raney + 39% Al + 24% HY + 16% boehmite) | 90 | 192 | 0.76 |
| 15 | 20% Co – 2% La/(1% Co Raney + 39% Al + 24% HY + 16% boehmite) | 85 | 188 | 0.75 |
| 16 | 20% Co – 2% Mg/(1% Co Raney + 39% Al + 24% HY + 16% boehmite) | 86 | 191 | 0.77 |
| 17 | 20% Co – 2% Cr/(1% Co Raney + 39% Al + 24% HY + 16% boehmite) | 88 | 190 | 0.73 |
| 18 | 20% Co – 2% Fe/(1% Co Raney + 39% Al + 24% HY + 16% boehmite) | 95 | 194 | 0.72 |
| 19 | 20% Co – 0.1% Re/(1% Co Raney + 39% Al + 24% HY + 16% boehmite) | 94 | 197 | 0.75 |

Therefore the catalyst and the preparation method thereof provide the catalyst stability to overheating and high productivity for the main products without lowering of conversion degree. The obtained product is defined by the catalyst composition and characterized by the expectation of the chain growth of 0.72-0.85.

The invention claimed is:

1. A catalyst for synthesis of hydrocarbons from CO and H$_2$ wherein the catalyst comprises dispersed particles of Raney cobalt powder or carbonyl cobalt as active component, metallic aluminium forming a spatial heat-conducting lattice and a binder, wherein the dispersed particles are embedded into the spatial heat-conducting lattice of metallic aluminium and the catalyst is pelletized.

2. The catalyst according to claim 1 wherein the Raney cobalt or carbonyl cobalt content is in the range 1-40% by weight based on the total weight of the catalyst.

3. The catalyst according to claim 1 wherein the metallic aluminium content is in the range 25-94% by weight based on the total weight of the catalyst.

4. The catalyst according to claim 1 wherein the metallic aluminium is a dispersed powder.

5. The catalyst according to claim 1 wherein the binder is boehmite or silicon oxide.

6. The catalyst according to claim 1 wherein the binder content is in the range 5-30% by weight based on the total weight of the catalyst.

7. The catalyst according to claim 1 wherein the catalyst further comprises the additives of oxides or mixed oxides of elements selected from the group consisting of Mg, Zr, Ti, Ca, Ba, Al, Si and mixtures thereof.

8. The catalyst according to claim 7, wherein the total content of said additives is in the range 0.5-30% by weight based on the total weight of the catalyst.

9. The catalyst according to claim 1 wherein the catalyst further comprises one or more additional active components.

10. The catalyst according to claim 9 wherein Co and/or Ru are used as additional active component(s).

11. The catalyst according to claim 10 wherein the additional active component(s) content is in the range 5-30% by weight based on the total weight of the catalyst.

12. The catalyst according to claim 1 wherein the catalyst further comprises a promoter selected from the group consisting of an element of Group II-VI and an element of Group VI-VIII of the Mendeleev's Periodic Table of the Elements.

13. A method for preparing a catalyst for synthesis of hydrocarbons from CO and H$_2$ comprising:
  mixing of dispersed Raney cobalt powder or carbonyl cobalt, metallic aluminium, a binder and a liquid phase to obtain a homogeneous paste;
  extruding the paste to form catalyst pellets with a spatial lattice of metallic aluminium and the Raney cobalt or carbonyl cobalt particles embedded into the lattice; and
  drying and calcinating of the pellets.

14. The method according to claim 13, wherein Raney cobalt and carbonyl cobalt are used in an amount of about 1-40% by weight based on the total weight of the catalyst.

15. The method according to claim 13, wherein metallic aluminium is used in an amount of about 25-94% by weight based on the total weight of the catalyst.

16. The method according to claim 13, wherein a boehmite or silicon oxide is used as the binder in an amount of about 5-30% by weight based on the total weight of the catalyst.

17. The method according to claim 13, wherein a mixture of distilled water, nitric acid or aqueous ammonia, triethylene glycol and/or polyvinyl alcohol is used as the liquid phase.

18. The method according to claim 13, wherein the drying of the pellets is carried out in air or inert gas flow at temperature of 25-120° C. for 12-36 hours.

19. The method of claim 18, wherein the drying of the pellets is carried out for 18-24 hours.

20. The method according to claim 13, wherein the calcinating of the pellets is carried out in air or inert gas flow in stages with an increase in temperature from 120 to 450° C. during 8-36 hours.

21. The method according to claim 20, wherein the calcinating of the pellets is carried out for 12-20 hours.

22. The method according to claim 13, further comprising:
introducing additional active components into the calcined pellets by impregnation in stages with a solution of metal compound, wherein the impregnation is repeated until a content of 5-30% of the active components by weight based on the total weight of the catalyst has been achieved.

23. The method according to claim 22, wherein after each stage of the impregnation, the drying of the pellets is performed on air at a temperature of 80-90° C. for 0.5-1.5 hours and then the pellets are calcinated in air flow at 200-450° C. during 0.5-15 hours.

24. The method of claim 22, wherein the solution of metal compound comprises one or more compound of Co and/or Ru.

* * * * *